US012584346B2

(12) United States Patent
Adams et al.

(10) Patent No.: US 12,584,346 B2
(45) Date of Patent: Mar. 24, 2026

(54) DEPLOYABLE DOORWAY BUMPER

(71) Applicant: Raytheon Company, Tewksbury, MA (US)

(72) Inventors: Richard J. Adams, Charlestown, MA (US); Ryan D. Tracy, Waltham, MA (US); James Strickler, Naples, ME (US)

(73) Assignee: RAYTHEON COMPANY, Tewksbury, MA (US)

( * ) Notice: Subject to any disclaimer, the term of this patent is extended or adjusted under 35 U.S.C. 154(b) by 0 days.

(21) Appl. No.: 18/517,982

(22) Filed: Nov. 22, 2023

(65) Prior Publication Data

US 2025/0163745 A1 May 22, 2025

(51) Int. Cl.
*E06B 3/88* (2006.01)
*E06B 1/34* (2006.01)
*E06B 7/28* (2006.01)

(52) U.S. Cl.
CPC .................. *E06B 1/34* (2013.01); *E06B 3/88* (2013.01); *E06B 7/28* (2013.01)

(58) Field of Classification Search
CPC ... E06B 1/34; E06B 1/342; E06B 7/36; E06B 3/88; E06B 7/367; B60R 2021/0442; B60R 13/043; B60R 2021/0435; E04F 19/028
See application file for complete search history.

(56) References Cited

U.S. PATENT DOCUMENTS 3,001,814 A * 9/1961 Skalko .................. B60R 13/043 16/86 A
3,800,488 A * 4/1974 Swanson ............... E06B 3/9685 52/309.1
4,040,142 A * 8/1977 Ippolito .................. E06B 7/367 49/383
4,768,320 A * 9/1988 Weller .................... E04G 21/30 52/211
4,928,430 A 5/1990 George
(Continued)

FOREIGN PATENT DOCUMENTS

CN 215904290 U 2/2022
TW M512057 U 11/2015

OTHER PUBLICATIONS

Invitation to Pay Additional Fees for corresponding PCT Patent Application No. PCT/US2024/047965 dated Jan. 10, 2025.
(Continued)

*Primary Examiner* — Catherine A Kelly
*Assistant Examiner* — Patrick B. Ponciano
(74) *Attorney, Agent, or Firm* — Getz Balich LLC

(57) ABSTRACT

A doorway is provided that includes a door frame, a door and a bumper. The door frame includes a passage, a header, a first jamb and a second jamb. The passage extends laterally between the first jamb and the second jamb. The passage extends vertically along the first jamb and the second jamb to the header. The door is configured to move between a closed position and an open position. The door closes the passage in the closed position. The door opens the passage in the open position. The bumper is configured to move between a deployed position and a stowed position. The bumper is disposed in the passage and covers a portion of the door frame in the deployed position.

18 Claims, 9 Drawing Sheets

(56) References Cited

U.S. PATENT DOCUMENTS

| | | | | |
|---|---|---|---|---|
| 5,737,878 | A * | 4/1998 | Raulerson | E06B 1/34 52/717.01 |
| 6,357,187 | B1 * | 3/2002 | Haldeman | E06B 3/88 52/717.06 |
| 6,497,073 | B2 * | 12/2002 | Webb | E06B 7/367 160/40 |
| 6,526,708 | B1 * | 3/2003 | Hartley | E06B 1/34 52/287.1 |
| 6,703,102 | B1 * | 3/2004 | Prescott | E06B 1/34 428/99 |
| 6,718,706 | B2 * | 4/2004 | Katz | E04G 21/30 52/211 |
| 6,829,864 | B2 * | 12/2004 | Mitchell | E04G 21/30 52/204.5 |
| 8,485,580 | B2 | 7/2013 | Ackerstein Klein | |
| 8,678,313 | B2 * | 3/2014 | Ross | B64D 45/00 244/121 |
| 9,162,644 | B2 * | 10/2015 | Greenwood | F41H 5/223 |
| 9,273,480 | B2 * | 3/2016 | Larochelle | E06B 1/342 |
| 9,752,291 | B2 * | 9/2017 | Michael | E01F 15/141 |
| 9,803,419 | B2 * | 10/2017 | Izod | E06B 7/36 |
| 10,995,534 | B1 * | 5/2021 | Dixon | E06B 3/4407 |
| 12,000,206 | B1 * | 6/2024 | Chapman | E06B 7/367 |
| 2002/0174613 | A1 | 11/2002 | Katz | |
| 2004/0088933 | A1 * | 5/2004 | Mayes | E04G 21/30 52/211 |
| 2005/0248184 | A1 * | 11/2005 | Piffaretti | B60J 5/04 180/274 |
| 2007/0137120 | A1 * | 6/2007 | Raymond | E06B 1/34 52/211 |
| 2011/0253839 | A1 | 10/2011 | Ross | |
| 2015/0375708 | A1 | 12/2015 | Greenwood | |
| 2020/0284086 | A1 * | 9/2020 | Volpe | E06B 1/34 |

OTHER PUBLICATIONS

ISR for PCT Patent Application No. PCT/US2024/047965 dated Mar. 18, 2025.

TW Office Action for TW Patent Application No. 113135732 dated Jun. 12, 2025.

* cited by examiner

DEPLOYABLE DOORWAY BUMPER

GOVERNMENT LICENSE RIGHTS

This invention was made with government support under contract no. HQ0147-18-D-0001 awarded by the United States Army. The government has certain rights in the invention.

BACKGROUND OF THE DISCLOSURE

1. Technical Field

This disclosure relates generally to a doorway and, more particularly, to safety equipment for a door frame.

2. Background Information

An individual may bump his/her head against a low header of a door frame when walking through a doorway. Various types and configurations of safety equipment are known in the art for reducing risk of head injury when walking through a doorway. While known safety equipment have various benefits, there is still room in the art for improvement.

SUMMARY OF THE DISCLOSURE

According to an aspect of the present disclosure, a doorway is provided that includes a door frame, a door and a bumper. The door frame includes a passage, a header, a first jamb and a second jamb. The passage extends laterally between the first jamb and the second jamb. The passage extends vertically along the first jamb and the second jamb to the header. The door is configured to move between a closed position and an open position. The door closes the passage in the closed position. The door opens the passage in the open position. The bumper is configured to move between a deployed position and a stowed position. The bumper is disposed in the passage and covers a portion of the door frame in the deployed position.

According to another aspect of the present disclosure, a doorway bumper is provided that includes a frame, a foam cushion and a mounting bracket. The frame includes a web, a first flange and a second flange. The web extends between and is connected to the first flange and the second flange. The first flange projects out from the web in a first direction to a distal end of the first flange. The second flange projects out from the web in a second direction to a distal end of the second flange. The second direction is opposite the first direction. The foam cushion is attached to the web, the first flange and the second flange. The foam cushion covers at least a first side of the frame. The mounting bracket is pivotally attached to the frame by one or more hinges.

According to still another aspect of the present disclosure, a method of operation is provided. During this method, a door is moved from a closed position to an open position to open a passage through a door frame. A bumper is automatically deployed to cover a header of the door frame as the door moves from the closed position to the open position.

The method may also include steps of: moving the door from the open position to the closed position to close the passage through the door frame; and automatically stowing the bumper as the door moves from the open position to the closed position.

The bumper may be hinged to the door frame.

The frame may be configured as a length of Z-bar. Alternatively, the frame may be configured with an L-shaped cross-sectional geometry or another cross-sectional geometry.

The foam cushion may have an L-shaped cross-sectional geometry.

The foam cushion may cover the distal end of the first flange and/or the distal end of the second flange.

Movement of the bumper from the deployed position to the stowed position may be kinematically tied to movement of the door from the open position to the closed position.

The doorway may also include a door brace, and the door brace may be configured as or otherwise include a linkage. A first end of the linkage may be coupled to the door. A second end of the linkage may be coupled to the door frame. The linkage may be configured to engage the bumper when the door moves from the open position to the closed position to actuate movement of the bumper from the deployed position to the stowed position.

The doorway may also include a piece of door hardware mounted to the door. The piece of door hardware may be configured to engage the bumper when the door moves from the open position to the closed position to push the bumper from the deployed position to the stowed position.

The piece of door hardware may be disengaged from the bumper when the door is in the open position.

Movement of the bumper from the stowed position to the deployed position may be kinematically tied to movement of the door from the closed position to the open position.

Movement of the bumper from the stowed position to the deployed position may be driven by gravity.

The header may be configured as or otherwise include the portion of the door frame.

The bumper may uncover the portion of the door frame in the stowed position.

The bumper may be disposed outside of the passage in the stowed position.

The bumper may be pivotally mounted to the header.

The bumper may be configured to pivot about a laterally extending pivot axis between the deployed position and the stowed position.

The bumper may include a bumper frame and a bumper cushion. The bumper frame may be hinged to the door frame. The bumper cushion may be attached to the bumper frame.

The bumper may have an L-shaped cross-sectional geometry.

The door may be hinged to the first jamb.

The door may engage the door frame in the closed position to provide a seal between the door and the door frame.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 2:
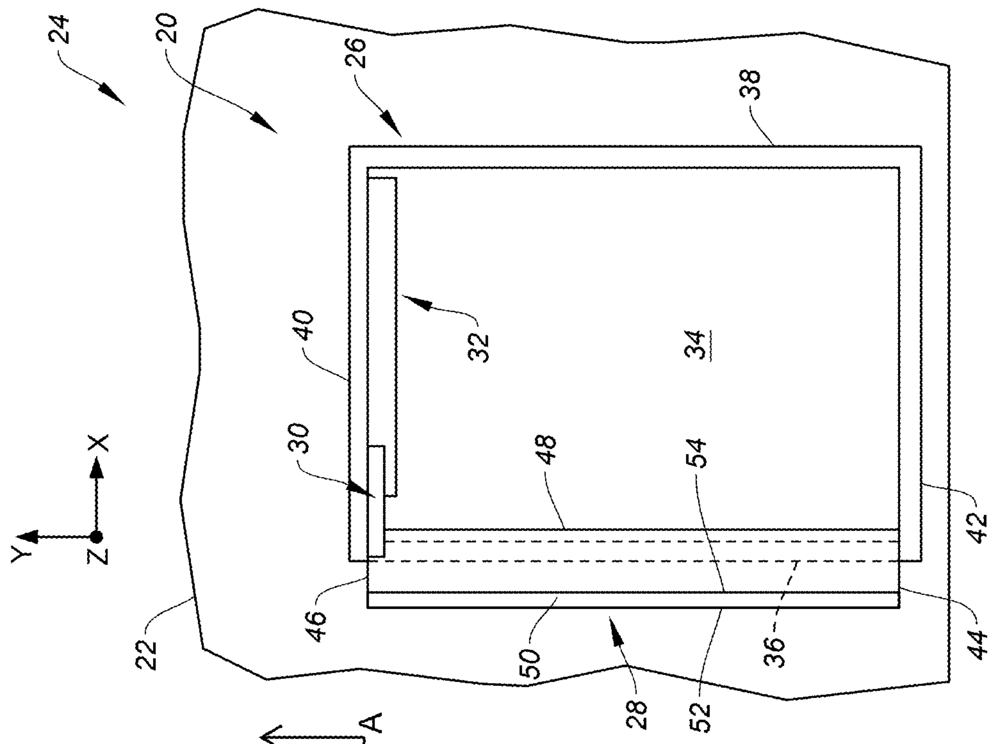
FIG. 2 is an illustration of a portion of the structure with the door in an open position.
Figure 1:
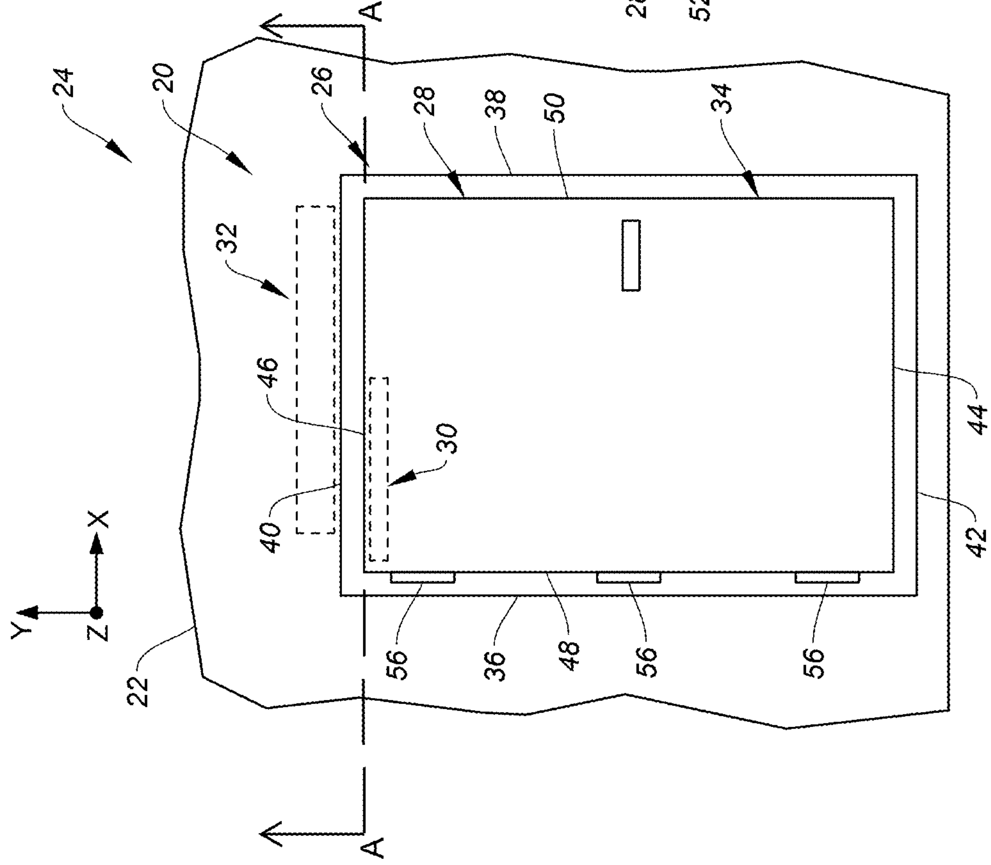
FIG. 1 is an illustration of a portion of a structure with a door in a closed position.

FIGS. 1 and 2 illustrate a doorway 20 through a wall 22 of a structure 24, where the doorway 20 is closed in FIG. 1 and where the doorway 20 is open in FIG. 2. The doorway 20 may be an exterior doorway where the wall 22 is an exterior wall of the structure 24. Alternatively, the doorway 20 may be an interior doorway where the wall 22 is an interior wall within the structure 24. Examples of the structure 24 include, but are not limited to, a mobile workstation (e.g., workspace within a shipping container or a trailer), an airframe (e.g., a fuselage) of an aircraft, a hull or a superstructure of a ship, a residential building, a commercial building, a government building, or any other mobile or stationary structure into and/or from which an individual may enter and/or exit through the doorway 20. The doorway 20 of FIGS. 1 and 2 includes a door frame 26, a door 28, a piece of door hardware 30 and a bumper assembly 32.

The door frame 26 is configured to frame out a passage 34 (e.g., a doorway opening) through the wall 22. The door frame 26 of FIGS. 1 and 2, for example, includes one or more door frame jambs 36 and 38, a door frame header 40 and a door frame sill 42. The frame header 40 extends laterally (e.g., in an x-axis direction) between and to the first frame jamb 36 and the second frame jamb 38. The frame sill 42 extends laterally between and to the first frame jamb 36 and the second frame jamb 38. The first frame jamb 36 is disposed to a lateral first side of the door frame 26. This first frame jamb 36 extends vertically (e.g., in a y-axis direction) between and to the frame header 40 and the frame sill 42. The first frame jamb 36 may also be connected to the frame header 40 and/or the frame sill 42. The second frame jamb 38 is disposed to a lateral second side of the door frame 26. This second frame jamb 38 extends vertically between and to the frame header 40 and the frame sill 42. The second frame jamb 38 may also be connected to the frame header 40 and/or the frame sill 42. With this arrangement, the door frame 26 and its members 36, 38, 40 and 42 frame out the passage 34 through the wall 22.

The passage 34 extends vertically within the door frame 26 between and to the frame header 40 and the frame sill 42. The passage 34 extends laterally within the door frame 26 between and to the first frame jamb 36 and the second frame jamb 38. The passage 34 extends depthwise (e.g., in a z-axis direction) through the door frame 26 thereby coupling (when open) spaces to opposing sides of the doorway 20.

The door 28 of FIG. 1 extends vertically between and to a bottom end 44 of the door 28 and a top end 46 of the door 28. The door 28 extends laterally between and to opposing lateral sides 48 and 50 of the door 28. The door 28 of FIG. 2 extends depthwise between and to opposing depthwise sides 52 and 54 of the door 28. The door 28 may be moveably mounted to the wall 22 through the door frame 26.

The door 28 of FIGS. 1 and 2, for example, is hinged to the door frame 26. More particularly, the door 28 of FIGS. 1 and 2 is pivotally attached to the first frame jamb 36 by one or more hinges 56. The door 28 is thereby configured to move (e.g., pivot) between a (e.g., fully) closed position of FIG. 1 and a (e.g., fully) open position of FIG. 2. In the closed position of FIG. 1, the door 28 closes (e.g., blocks, covers, obstructs, plugs, etc.) the passage 34 and, more generally, the doorway 20. In the open position of FIG. 2, the door 28 opens (e.g., unblocks, uncovers, un-obstructs, unplugs, etc.) the passage 34 and, more generally, the doorway 20.

Figure 3:
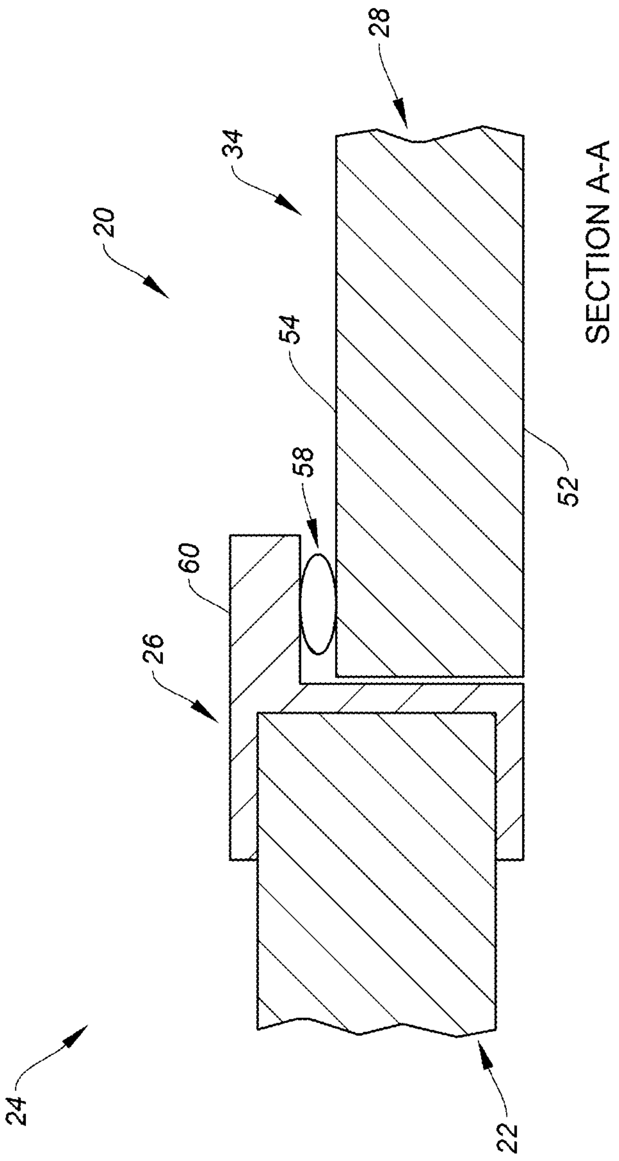
FIG. 3 is an illustration of a sealed interface along a section of a doorway.

In the closed position of FIG. 1, an outer periphery of the door 28 may directly or indirectly engage the door frame 26 to provide a sealed interface between the door 28 and the door frame 26. For example, referring to FIG. 3, the door 28 may abut depthwise against and contact a seal element 58 attached to the door frame 26. Here, the seal element 58 of FIG. 3 is pressed (e.g., compressed) depthwise between a rigid member 60 (e.g., see 36, 38, 40, 42 of FIG. 1) of the door frame 26 and the door 28. With this arrangement, the sealed interface between the door 28 and the door frame 26 may form a weather seal, a gas seal (e.g., an air seal), an electromagnetic interference (EMI) seal and/or the like. When the door 28 is in the closed position/the doorway 20 is closed, the doorway 20 (e.g., substantially or completely) separates environments in the spaces to the opposing sides of the doorway 20.

Figure 4:
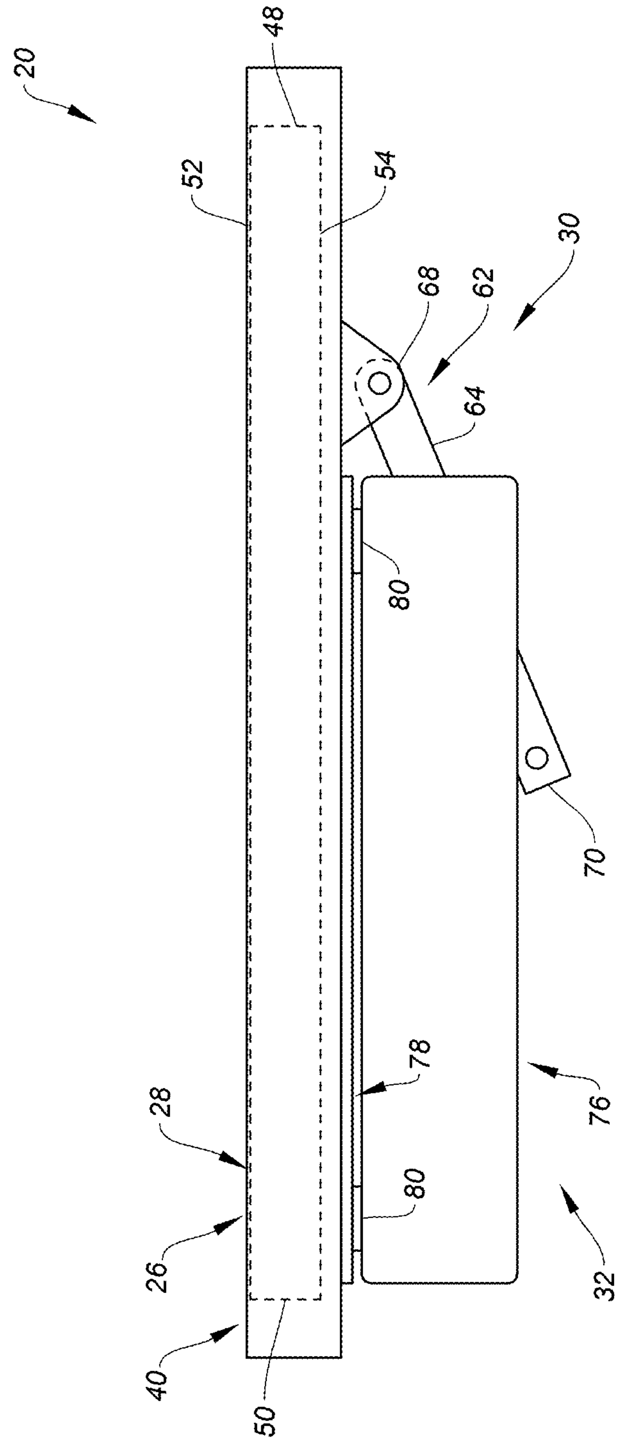
FIG. 4 is a plan view illustration of the doorway with the door in the closed position.
Figure 5:
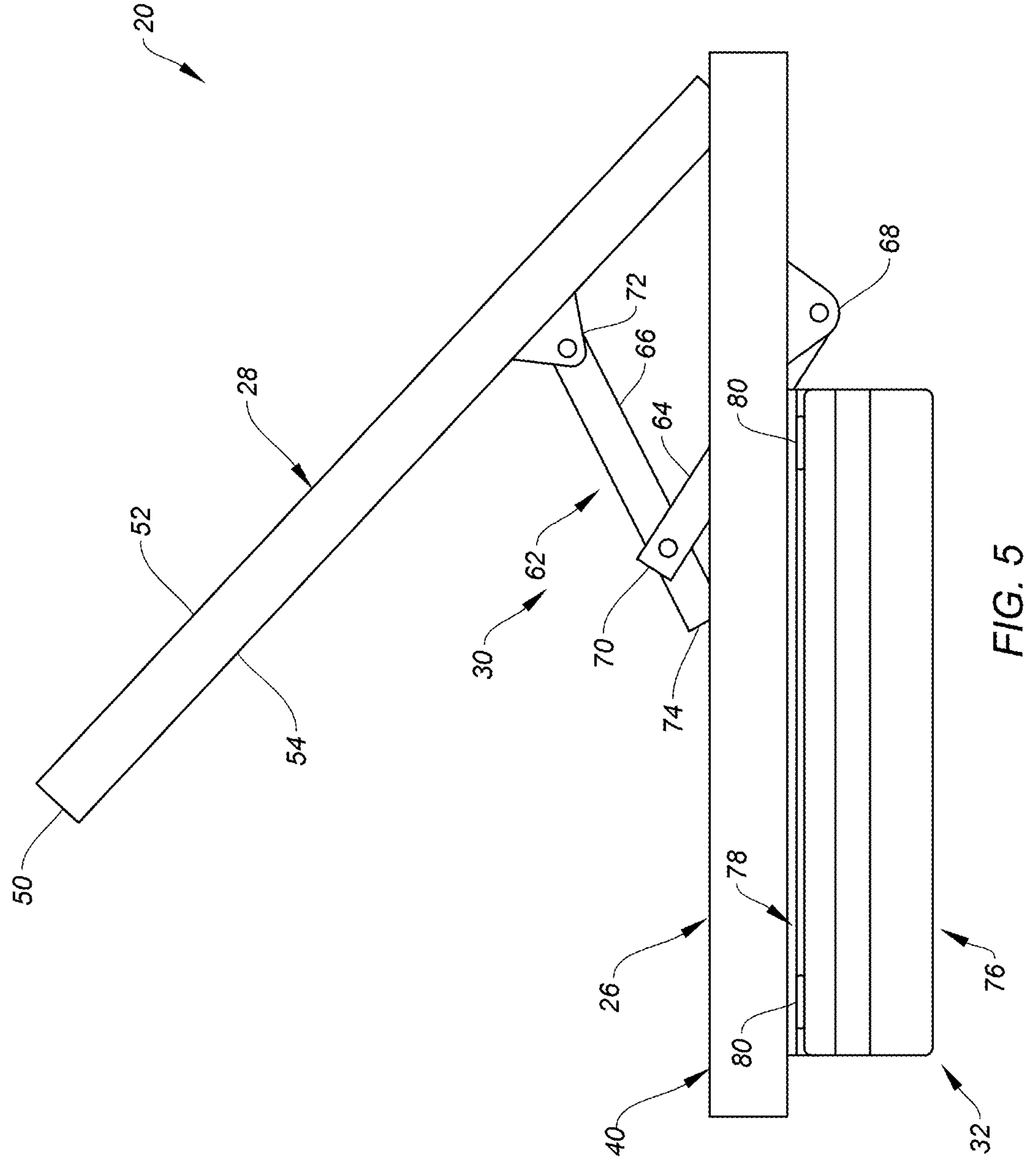
FIG. 5 is a plan view illustration of the doorway with the door in an intermediate position.
Figure 6:
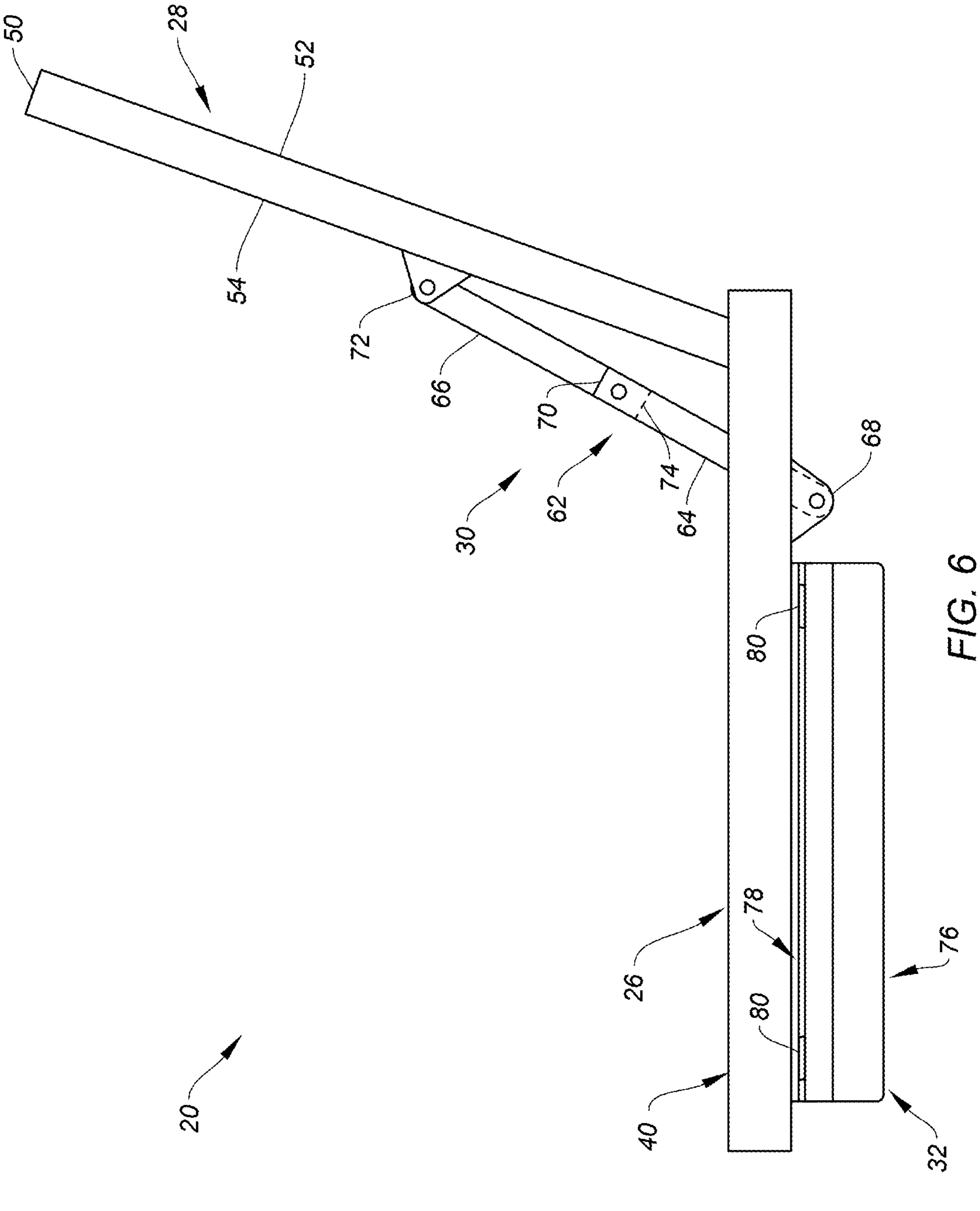
FIG. 6 is a plan view illustration of the doorway with the door in the open position.

Referring to FIGS. 4-6, the piece of door hardware 30 may be or otherwise include a door brace 62. This door brace 62 may be configured hold the door 28 in the open position of FIG. 6; see also FIG. 1. The door brace 62 may also or alternatively be configured to facilitate closing of the door 28 to the closed position of FIG. 4. The door brace 62, for example, may be configured as a door closer device. The door brace 62 of FIGS. 5 and 6 includes a door brace linkage (e.g., a bifold linkage) with one or more links 64 and 66; e.g., struts, arms, etc. The frame link 64 extends longitudinally from a first end 68 of the frame link 64 to a second end 70 of the frame link 64. The frame link first end 68 of FIGS. 5 and 6 is a frame-side end of the linkage, and this frame link 64 is pivotally coupled to the door frame 26 and its frame header 40 at (e.g., on, adjacent or proximate) the frame link first end 68. The door link 66 extends longitudinally from a first end 72 of the door link 66 to a second end 74 of the door link 66. The door link first end 72 of FIGS. 5 and 6 is a door-side end of the linkage, and this door link 66 is pivotally coupled to the door 28 at the door link first end 72. The door link 66 is also pivotally coupled to the frame link 64 at the door link second end 74 and/or the frame link second end 70.

Figure 7:
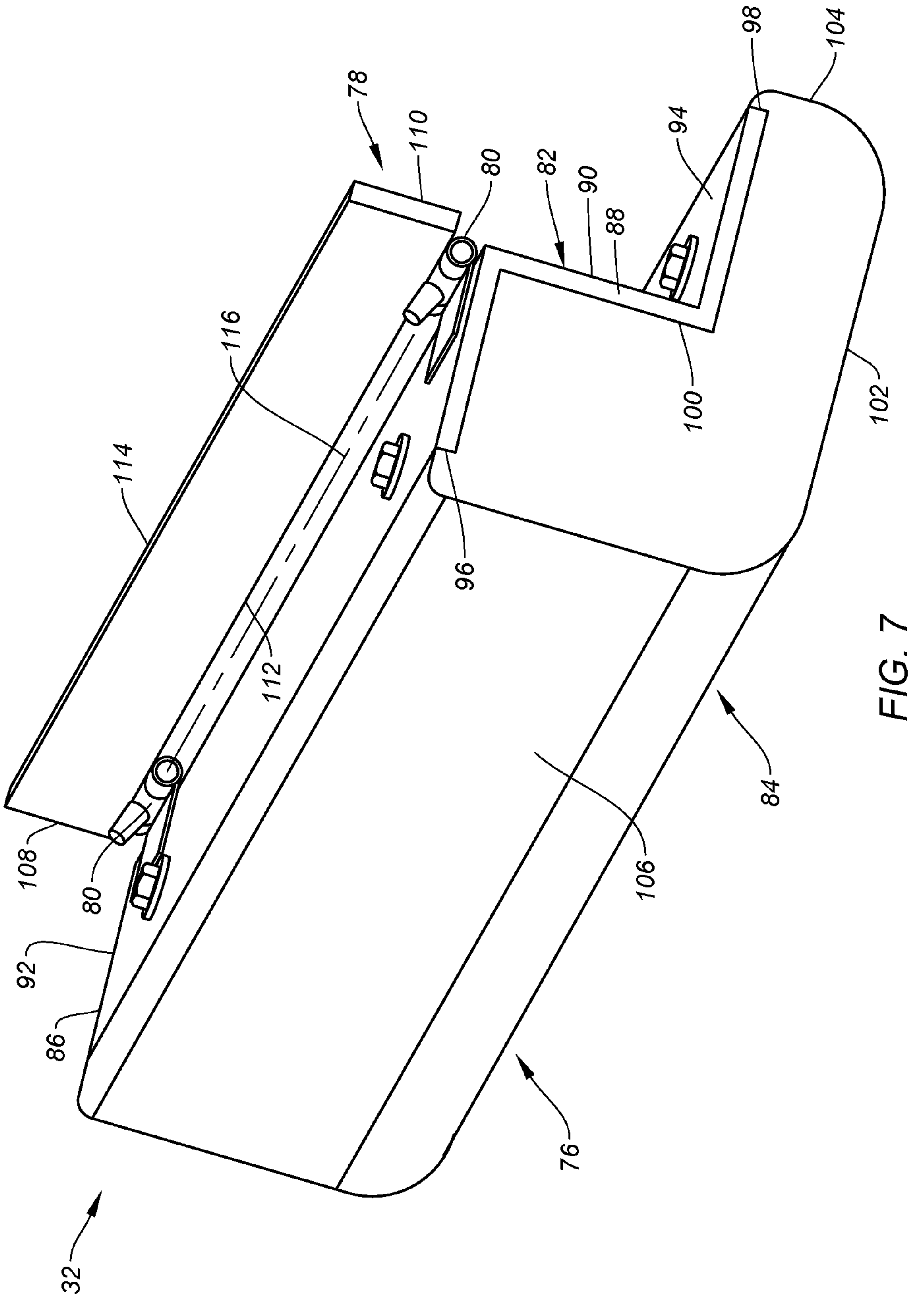
FIG. 7 is a perspective illustration of a doorway bumper.

Referring to FIG. 7, the bumper assembly 32 includes a doorway bumper 76, a bumper mount 78 and one or more bumper hinges 80. The doorway bumper 76 of FIG. 7 includes a bumper frame 82 and a bumper cushion 84; e.g., a pad. For ease of description, the bumper assembly 32 and its members 76, 78 and 80 may be described below with reference to an orientation when the doorway bumper 76 is deployed; e.g., see FIGS. 2 and 6.

The bumper frame 82 extends laterally between and to opposing lateral ends 86 and 88 of the bumper frame 82. The bumper frame 82 may be configured as a length of Z-bar. The bumper frame 82 of FIG. 7, for example, includes a web 90, a first flange 92 and a second flange 94. The web 90 extends vertically between and to the first flange 92 and the second flange 94. The web 90 is also connected to (e.g., formed integral with) the first flange 92 and the second flange 94. The first flange 92 projects depthwise out from the web 90 in a first direction to a distal end 96 of the first flange 92. The second flange 94 projects depthwise out from the web 90 in a second direction to a distal end 98 of the second flange 94, where the second direction is opposite the first direction. The present disclosure, however, is not limited to such an exemplary bumper frame configuration. For example, the bumper frame 82 may alternatively be configured as a length of angle iron; e.g., a bar with an L-shaped cross-sectional geometry. In another example, the bumper frame 82 may be configured as a length of flat plate.

The bumper frame 82 may be constructed from a relatively stiff, rigid frame material. Examples of the frame material include, but are not limited to, metal (e.g., bent metal plate or sheet metal), fiber-reinforced composite material, plastic, or the like.

The bumper cushion 84 is attached (e.g., bonded and/or otherwise fastened) to the bumper frame 82. This bumper cushion 84 is configured to (e.g., completely) cover at least (or only) a bottom side 100 of the bumper frame 82. The bumper cushion 84 of FIG. 7, for example, projects vertically out from the frame bottom side 100 along the frame flanges 92 and 94 to an exposed bottom surface 102 of the doorway bumper 76 and its bumper cushion 84. The bumper cushion 84 projects depthwise (e.g., in the first direction and along the second flange 94) from the web 90 to an exposed first side surface 104 of the doorway bumper 76 and its bumper cushion 84. The bumper cushion 84 also extends depthwise (e.g., along the frame flanges 92 and 94) from an exposed second side surface 106 of the doorway bumper 76 and its bumper cushion 84 to the bumper first side surface 104. The bumper cushion 84 may also cover the first flange distal end 96 and/or the second flange distal end 98. With the arrangement of FIG. 7, the bumper cushion 84 and, more generally, the doorway bumper 76 may be configured with an L-shaped cross-sectional geometry when viewed, for example, in a reference plane perpendicular to a longitudinal centerline of the doorway bumper 76. The bumper cushion 84 may be constructed from a relatively flexible, deformable and/or elastic bumper material. The bumper material, for example, may be an open cell or a closed cell polymer (e.g., rubber) foam.

The bumper mount 78 may be configured as a mounting plate for the doorway bumper 76. This bumper mount 78 extends laterally between and to opposing lateral ends 108 and 110 of the bumper mount 78. The bumper mount 78 extends vertically from a bottom side 112 of the bumper mount 78 to a top side 114 of the bumper mount 78. The bumper mount 78 may be constructed from a relatively stiff, rigid mount material. Examples of the mount material include, but are not limited to, metal (e.g., bent metal plate or sheet metal), fiber-reinforced composite material, plastic, or the like.

The bumper hinges 80 are arranged laterally along and connected to the doorway bumper 76 and the bumper mount 78. The bumper hinges 80 thereby pivotally attach the doorway bumper 76 and its bumper frame 82 to the bumper mount 78.

Figure 8:
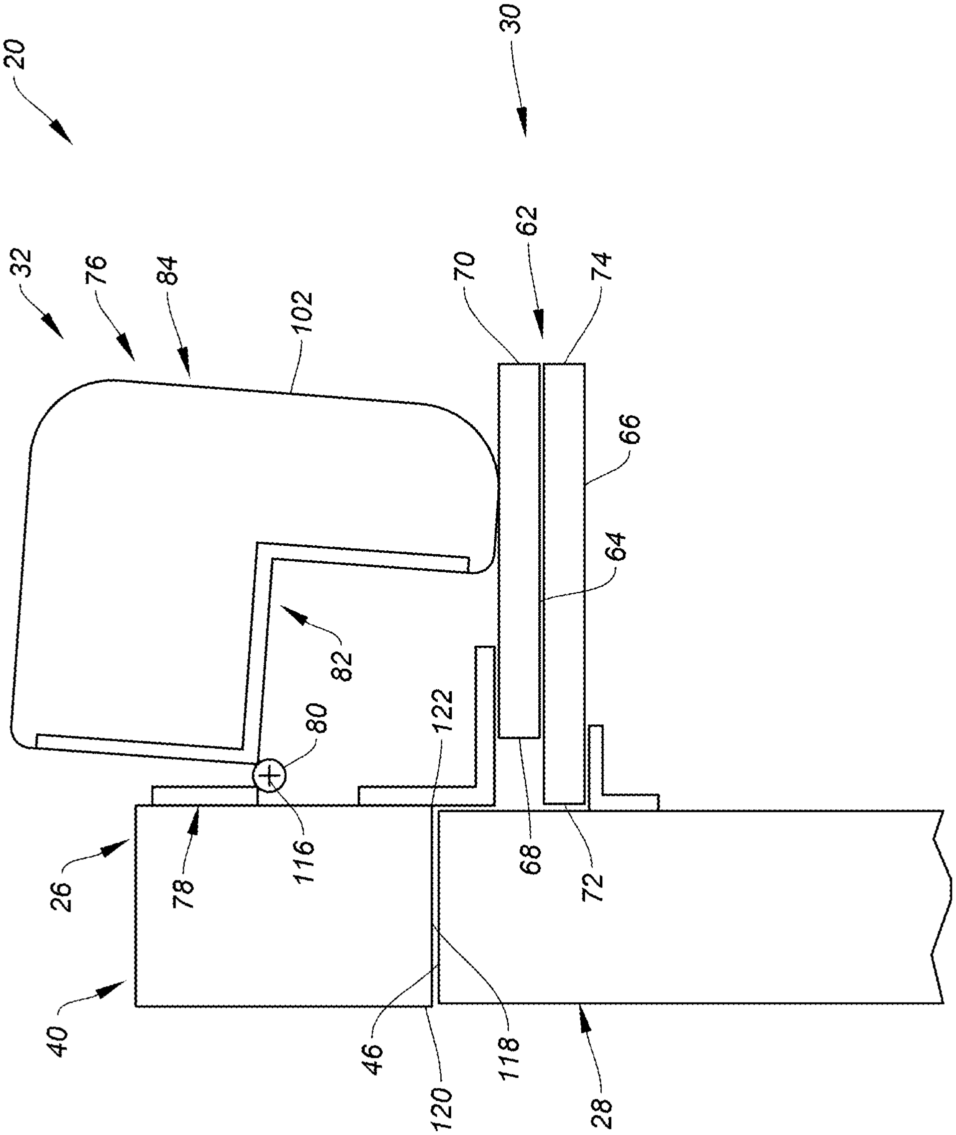
FIG. 8 is a side view illustration of a section of the doorway with the door in the closed position.
Figure 9:
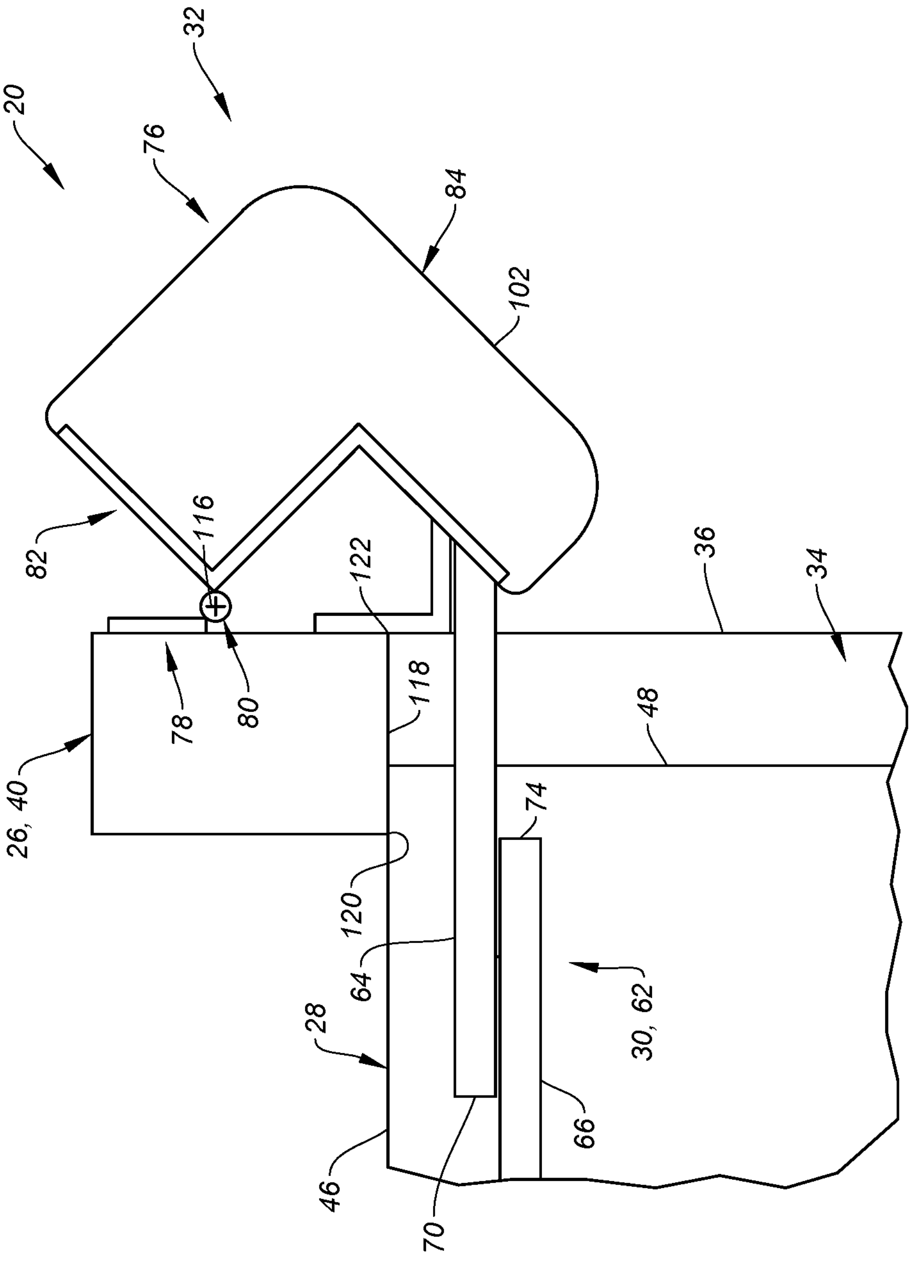
FIG. 9 is a side view illustration of a section of the doorway with the door in the intermediate position.
Figure 10:
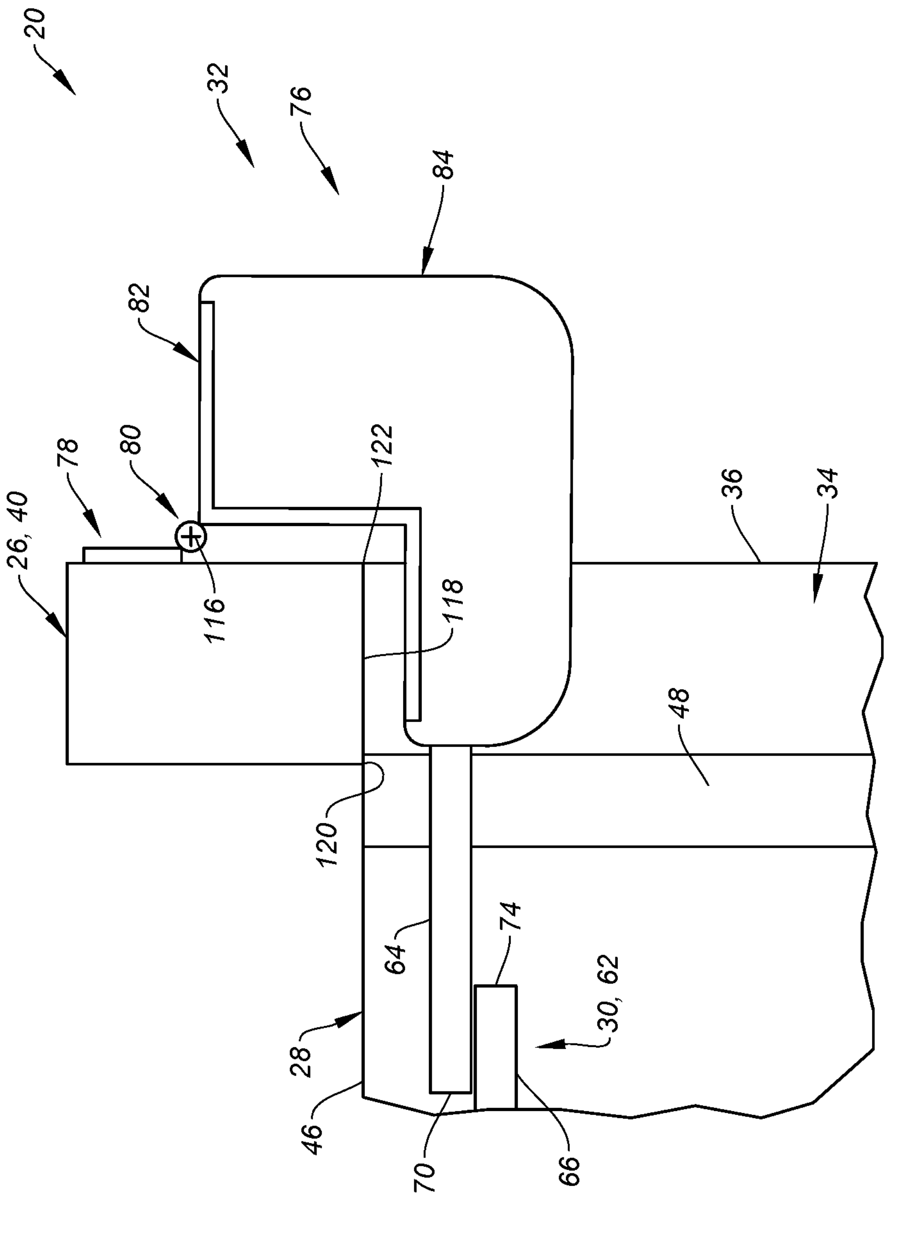
FIG. 10 is a side view illustration of a section of the doorway with the door in the open position.

Referring to FIGS. 8-10, the doorway bumper 76 is moveably mounted to the wall 22 (see FIGS. 1 and 2) through the door frame 26. The doorway bumper 76 of FIGS. 8-10, for example, is hinged to the door frame 26. More particularly, bumper mount 78 is fixedly mounted to the door frame 26 and its frame header 40. The bumper mount 78 and the bumper hinges 80 of FIGS. 8-10 therefore pivotally mount the doorway bumper 76 to the door frame 26 and its frame header 40. The doorway bumper 76 is thereby configured to pivot about a laterally extending pivot axis 116 between a (e.g., fully) stowed position of FIG. 8 and a (e.g., fully) deployed position of FIG. 10. In the stowed position of FIG. 8, the doorway bumper 76 exposes at least a portion (or an entirety) of the door frame 26 and its frame header 40. The doorway bumper 76, for example, may uncover a bottom surface 118 of the frame header 40. The doorway bumper 76 may also be disposed (e.g., partially or completely) outside of the passage 34. However, in the deployed position of FIG. 10, the doorway bumper 76 covers at least a portion of the door frame 26 and its frame header 40. The doorway bumper 76, for example, may cover a major portion (e.g., more than fifty or seventy percent) of the header bottom surface 118. The doorway bumper 76 may also provide a physical buffer about corners 120 and 122 of the frame header 40. Here, the doorway bumper 76 is disposed in (e.g., projects into, extends across, etc.) the passage 34.

With the above operability, the doorway bumper 76 provides a protective covering and/or barrier along and over (here, vertically below) the frame header 40 when deployed. Therefore, if a relatively tall individual walks through the doorway 20 and forgets to duck his/her head, the head of the individual may bump again the relatively soft bumper cushion 84 rather than a relatively hard corner (e.g., 120, 122) of the door frame 26 and its frame header 40. However, when stowed, the doorway bumper 76 is retracted from the deployed position and may facilitate unobstructed closing of the door 28. The door 28 may therefore fully close and engage the door frame 26 to provide the sealed interface.

The movement of the doorway bumper 76 from its deployed position to its stowed position, and from its stowed position to its deployed position, may be kinematically tied to the movement of the door 28. For example, referring to FIGS. 8-10 (see also FIGS. 4-6), the linkage and its link(s) 64 and/or 66 may depthwise engage (e.g., contact, abut against) the bumper frame 82 as the door 28 moves from its open position towards its closed position. As the door 28 continues to close, the linkage may depthwise push against the bumper frame 82 and, more generally, the doorway bumper 76 thereby pivoting the doorway bumper 76 from its deployed position to its stowed position. Thus, the stowing of the doorway bumper 76 is automatically tied to the closing of the door 28. By contrast, when the door 28 moves from its closed position to its open position, gravity may drive the doorway bumper 76 to pivot from its stowed position to its deployed position. Here, the motion of the doorway bumper 76 is driven by gravity; however, the linkage facilitates controlled movement of the doorway bumper 76 as the doorway bumper 76 and its bumper frame 82 may rest against the linkage until the doorway bumper 76 is in its deployed position. Once in the deployed position, the linkage and its link(s) 64 and/or 66 may disengage from (e.g., move away from, no longer contact) the doorway bumper 76 and its bumper frame 82 as the door 28 moves to its open position. Thus, the deploying of the doorway bumper 76 is automatically tied to the opening of the door 28.

As described above, the linkage may engage the doorway bumper 76 and its bumper frame 82 to facilitate the movement of the doorway bumper 76 between the stowed and deployed positions. It is contemplated, however, that one or more other pieces of hardware mounted to the door 28 may also or alternatively facilitate the movement of the doorway bumper 76 between the stowed and deployed positions.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A doorway, comprising:

a door frame including a passage, a header, a first jamb and a second jamb, the passage extending laterally between the first jamb and the second jamb, and the passage extending vertically along the first jamb and the second jamb to the header;

a door configured to move between a closed position and an open position, the door closing the passage in the closed position, and the door opening the passage in the open position; and a bumper configured to move between a deployed position and a stowed position, the bumper disposed in the passage and covering a portion of the door frame in the deployed position, and the bumper directly pivotally mounted to the header;

wherein movement of the bumper from the stowed position to the deployed position is driven by gravity.

2. The doorway of claim 1, wherein movement of the bumper from the deployed position to the stowed position is kinematically tied to movement of the door from the open position to the closed position.

3. The doorway of claim 1, further comprising:

a door brace comprising a linkage;

a first end of the linkage coupled to the door; and a second end of the linkage coupled to the door frame;

wherein the linkage is configured to engage the bumper when the door moves from the open position to the closed position to actuate movement of the bumper from the deployed position to the stowed position.

4. The doorway of claim 1, further comprising:

a piece of door hardware mounted to the door;

wherein the piece of door hardware is configured to engage the bumper when the door moves from the open position to the closed position to push the bumper from the deployed position to the stowed position.

5. The doorway of claim 4, wherein the piece of door hardware is disengaged from the bumper when the door is in the open position.

6. The doorway of claim 1, wherein movement of the bumper from the stowed position to the deployed position is kinematically tied to movement of the door from the closed position to the open position.

7. The doorway of claim 1, wherein the header comprises the portion of the door frame.

8. The doorway of claim 1, wherein the bumper uncovers the portion of the door frame in the stowed position.

9. The doorway of claim 1, wherein the bumper is disposed outside of the passage in the stowed position.

10. The doorway of claim 1, wherein the bumper is configured to pivot about a laterally extending pivot axis between the deployed position and the stowed position.

11. The doorway of claim 1, wherein the bumper includes a bumper frame and a bumper cushion;

the bumper frame is hinged to the door frame; and the bumper cushion is attached to the bumper frame.

12. The doorway of claim 1, wherein the bumper has an L-shaped cross-sectional geometry.

13. The doorway of claim 1, wherein the door is hinged to the first jamb.

14. The doorway of claim 1, wherein the door engages the door frame in the closed position to provide a seal between the door and the door frame.

15. A doorway bumper for attaching to a header of a doorway, the doorway bumper comprising:

a frame including a web, a first flange and a second flange, the web extending between and connected to the first flange and the second flange, the first flange projecting out from the web in a first direction to a distal end of the first flange, and the second flange projecting out from the web in a second direction to a distal end of the second flange, wherein the second direction is opposite the first direction, the frame configured as a length of Z-bar;

a cushion attached to the web, the first flange and the second flange, and the cushion covering at least a first side of the frame, the cushion comprising a foam polymer material, and the cushion completely covering at least a bottom side of the frame; and a mounting bracket directly pivotally attached to the frame by one or more hinges and attached to the header of the doorway.

16. A method of operation, comprising:

moving a door from a closed position to an open position to open a passage through a door frame; and automatically deploying a bumper to cover a header of the door frame as the door moves from the closed position to the open position;

wherein movement of the bumper is driven by gravity as the door moves from the closed position to the open position and as the bumper is automatically deployed; and wherein the bumper comprises:

a bumper frame including a web, a first flange and a second flange, the web extending between and connected to the first flange and the second flange, the first flange projecting out from the web in a first direction to a distal end of the first flange, and the second flange projecting out from the web in a second direction to a distal end of the second flange, wherein the second direction is opposite the first direction, the bumper frame configured as a Z-bar;

a cushion attached to the web, the first flange and the second flange, and the cushion covering at least a first side of the bumper frame, the cushion comprising a foam polymer material, and the cushion completely covering at least a bottom side of the bumper frame; and a mounting bracket directly pivotally attached to the bumper frame by one or more hinges.

17. The method of claim 16, further comprising:

moving the door from the open position to the closed position to close the passage through the door frame; and automatically stowing the bumper as the door moves from the open position to the closed position.

18. The method of claim 16, wherein the bumper is hinged to the door frame by the one or more hinges.

* * * * *